United States Patent [19]
Isaacs et al.

[11] 3,931,595
[45] Jan. 6, 1976

[54] OPTICAL WAVEGUIDE MODULATOR USING SINGLE CRYSTALS OF TlGaSe$_2$ OR β-TlInS$_2$

[75] Inventors: Thelma J. Isaacs, Monroeville; Milton Gottlieb, Pittsburgh; John D. Feichtner, Murrysville, all of Pa.

[73] Assignee: Westinghouse Electric Corporation, Pittsburgh, Pa.

[22] Filed: Apr. 23, 1974

[21] Appl. No.: 463,338

[52] U.S. Cl.................................. 332/7.51; 350/161
[51] Int. Cl.$^2$........................ G02F 1/11; H01S 3/10
[58] Field of Search........ 332/7.51; 350/161, 160 R; 250/199

[56] References Cited
UNITED STATES PATENTS
3,743,970  7/1973  Bonner et al. ..................... 332/7.51

OTHER PUBLICATIONS
Walsh, Electro–Technology, Feb. 1969, pp. 29–33.
Pinnow, *IEEE Journal of Quantum Electronics,* Vol. QE–6, No. 4, Apr. 1970, pp. 223–238.

*Primary Examiner*—Richard A. Farley
*Attorney, Agent, or Firm*—R. D. Fuerle

[57] ABSTRACT

An optical waveguide modulator is disclosed which uses single crystals of TlGaSe$_2$ or TlInS$_2$. The optical waveguide modulator is used to impress a signal upon a light beam traveling in a waveguide. Monochromatic light is guided along a thin plate of the crystal. Acoustic waves are generated which move across the thickness of the crystal, modulating the light. The frequency, polarization, or mode of the light can be modulated by the acoustic waves.

14 Claims, 1 Drawing Figure

U.S. Patent  Jan. 6, 1976  3,931,595
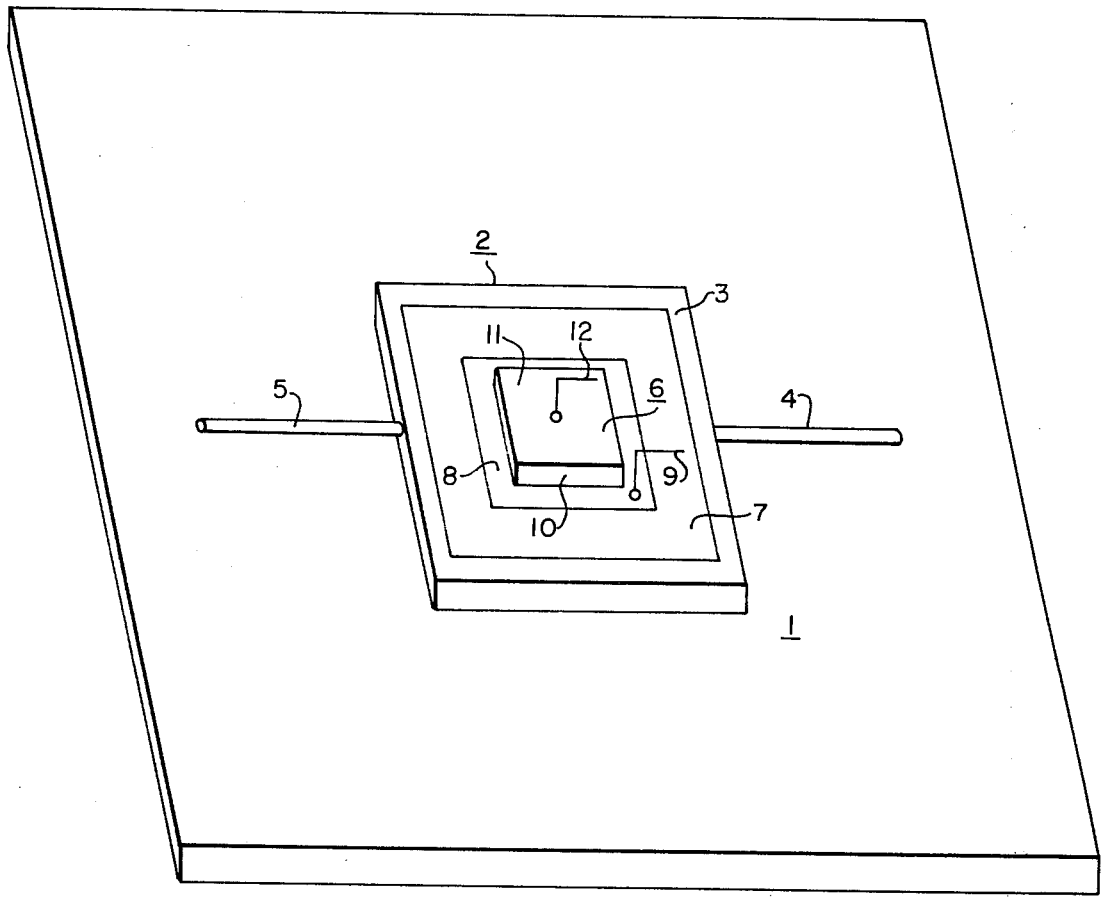

OPTICAL WAVEGUIDE MODULATOR USING SINGLE CRYSTALS OF TlGaSe₂ OR β-TlInS₂

BACKGROUND OF THE INVENTION

The discovery of glass fibers which can conduct light with very small losses, of low-cost solid-state diode lasers, and of techniques for masking and etching surfaces by an electron beam to form structures of micron size, has created a demand for solid-state optical waveguide modulators. An optical waveguide modulator alters the frequency, intensity, or polarization of a beam of light traveling in a waveguide. This can be accomplished by guiding the light through a specific material, which may be a single cyrstal, and generating acoustic waves in this material.

Crystals which are useful in optical waveguide modulators are those which are highly efficient at modulating light with an acoustic wave. A measure of this efficiency is given by the opto-acoustic figure of merit, $M_2$, which is equal to $$n^6 p^2 / \rho v^3$$

where $n$ is the refractive index, $p$ is the photo-elastic coefficient, $\rho$ is the density, and $v$ is the acoustic velocity. Large values of figure of merit are obtained in materials with a large refractive index and a low acoustic velocity.

In addition to a high opto-acoustic figure of merit, a good crystal should exhibit a low attenuation of high frequency sound waves so that the crystal can be used to modulate a wide band of light frequencies. The modulation of a wide band of light frequencies requires the propagation of acoustic waves at high frequencies, but in most materials high frequency acoustic waves are absorbed after traveling only a very small distance. Therefore, a material which can be made in very thin single crystal layers can be used to modulate a wider band of light frequencies since high frequency acoustic waves cross the cyrstal before being absorbed. However, it is very difficult to make a very thin single crystal layer of most suitable materials by sputtering, vacuum evaporation, or other available techniques since usually a polycrystalline layer is produced instead of a single crystal. The polycrystalline layers produced this way are optically very lossy. Cleavage of the material into very thin plates is not possible with most otherwise-suitable materials since their crystal structures do not permit such cleavage to occur.

Finally, the crystal should have good optical quality and a transparency range which includes the wavelengths of common solid-state light diodes.

A good summary of thin film waveguide devices can be found in an article by P. K. Tien in the April, 1974 issue of Scientific American, titled "Integrated Optics."

PRIOR ART

U.S. Pat. No. 3,110,685 discloses the preparation of polycrystalline samples of TlGaSe₂ and TlInS₂ for photoconductor and semiconductor applications. Large, single crystals were not prepared and opto-acoustic properties were not investigated.

An article by H. Hahn and B. Wellmann in Naturwissenschaften, Vol. 54, page 42 (1967) titled "On Ternary Chalcogenides Of Thallium, With Gallium And Indium" describes the preparation of polycrystalline samples of TlGaSe₂ and TlInS₂.

An article titled "On Some properties Of TlInS₂ (Se₂, Te₂) Single Crystals" by G. D. Guseinov, E. Mooser, E. M. Kerimova, R. S. Gamidov, I. V. Alekseev, and M. Z. Ismailov in Phys. Stat. Sol., Vol. 33, pages 33 to 44 discusses the preparation of large, single crystals of β-TlInS₂. Opto-acoustic properties are not mentioned.

An article titled "About A Group Of Three-Component Compounds Being Analogous to Binary Semiconductors Of The $A^{III}B^{VI}$ Type" by G. D. Guseinov, A. M. Ramazanzade, E. M. Kerimova and M. Z. Ismailov discusses the preparation of single crystals of InTlS₂ and InTlSe₂. Opto-acoustic properties are not mentioned.

Also of interest in an article by G. B. Brandt, M. Gottlieb and J. J. Conroy is Applied Physical Letters, Vol. 23, No. 2, pages 53 to 54 (July 15, 1973), titled "Bulk Acoustic Wave Interaction With Guided Optical Waves," which describes an optical waveguide modulator in which the guided light interacts with bulk acoustic waves in a layer of sputtered, high refractive index glass.

SUMMARY OF THE INVENTION

We have discovered that crystals of TlGaSe₂ and TlInS₂ have excellent opto-acoustic properties which make them very useful in optical waveguide modulators. These crystals both cleave to form very thin plates so that they can be used for wide band optical waveguide modulators. The TlGaSe₂ crystal has a high figure of merit and the figure of merit of TlInS₂ is expected to be comparable. The crystals are of good optical quality and have a useful transparency range extending into the infrared. A wideband optical waveguide modulator can be used to combine many signals onto a single optical carrier by using known multiplexing techniques.

DESCRIPTION OF THE INVENTION

The accompanying drawing is an isometric view of a certain presently preferred embodiment of an optical waveguide modulator according to this invention. Other optical waveguide modulator configurations can also be used.

In the drawing, a substrate 1 acts as a support for optical waveguide modulator 2 and various other thin-film waveguide devices such as switches, prisms, lasers, etc. (not shown) which may be mounted on the substrate. The substrate should be flat, should not absorb light from the modulator, and should have a lower refractive index than the crystal in the modulator to prevent light from leaking out of the modulator. Typical substrates are made of glass or quartz, but other materials such as plastics could also be used. The modulator can be cemented to the substrate by any suitable optical cement.

Modulator 2 consists of single crystal 3, optical fibers 4 and 5, and transducer 6. Optical fibers 4 and 5 are examples of waveguides which transmit light into and away from the crystal, respectively. The ends of these fibers which contact the crystal must be very flat and smooth in order to avoid loss of light. The ends may be attached to the crystal by means of any suitable optical cement. The optical fibers are typically made of glass, silica, or plastic although other suitable materials could also be used. Light can also be passed through the crystal by means of a thin film waveguide deposited on the substrate which contacts the crystals.

In between transducer 6 and crystal 3 is a film 7 of a material which has a lower refractive index than the crystal. This film is placed on the crystal to prevent the transducer electrode from absorbing light from the crystal. This film is typically about 3000 to about 4000 A thick and can be deposited, for example, by vacuum evaporation. Suitable materials include most alkali or alkaline-earth metal fluorides, plastics such as polytetrafluoroethylene, etc.

The transducer is a device which produces sound waves in the crystal in response to an electrical signal. In the drawing transducer 6 consists of a first conducting layer 8 to which is attached a wire 9, a layer of a piezoelectric material 10, such as zinc oxide, which responds to an electric field by producing an acoustic wave, and a second conducting layer 11 to which is attached wire 12. An electrical field is applied to material 10 through wires 9 and 12 to produce an acoustic wave. Typically, about 100 to about 500 mW are required to operate the transducer. The frequency of the wave is determined by the thickness of the transducer. The type of acoustic wave generated is determined by the orientation of material 10 used in the transducer. For example, shear waves are produced by Y- or AC-cut quartz and X-cut lithium niobate, and longitudinal waves are produced by X-cut quartz. The shear waves may be parallel or perpendicular to the light beam, depending on the orientation of the transducer. The construction and operation of acoustic wave-generating transducers is a well-known technology.

OPERATION OF THE MODULATOR

To operate the modulator a beam of light is passed down optical fiber 4 into the crystal. This light should be monochromatic in order to avoid the effects of dispersion which limit the bandwidth of the signal which can be propagated. The light need not be coherent, but coherent light is preferred as it is available in high intensity and high monochromaticity. The light may be polarized or not, as desired.

When light is incident on the end of a waveguide it is found that it will propagate in the waveguide only at certain angles of incidence corresponding to discrete modes. The number of said modes which may propagate in the waveguide depends upon the refractive indices of the waveguide material and the substrate, and upon the thickness of the waveguide—the thicker the waveguide is, the greater is the number of propagation modes. If a large number of modes are present, the light will spontaneously change modes as it propagates which will distort the output signal. Such a distortion may be tolerated if the signal is of a narrow bandwidth, but it prohibits the use of large bandwidth signals. Therefore, it is preferred to use a waveguide thin enough so that the light has only a small number (i.e., 1 to 6) of modes.

The type of modulation of the light beam which occurs depends upon the type of acoustic wave. Perpendicular shear acoustic waves result in mode conversion, (i.e., polarization), and frequency modulation. Intensity modulation can, of course, be obtained by passing the output light beam through a polarizer. Parallel shear waves and longitudinal waves produce only frequency modulation and therefore perpendicular shear waves are preferred. There is no lower limit on the acoustic frequency that will produce an interaction. The upper acoustic frequency limit depends upon the thickness of the crystal. Using a value of 3dB as a maximum tolerable attenuation, the upper frequency limit (in MHz) is equal to $3.6 \times 10^2$ divided by the square root of the thickness in centimeters. This formula was established by measuring the attenuation coefficient at low frequency and assuming an $f^2$ dependence of attenuation on frequency.

THE CRYSTALS

For use in an optical waveguide modulator, the crystal should be 1 to about $50\mu m$ in thickness. A crystal less than $1\mu m$ would be too fragile to work with, and a crystal thicker than about $50\mu m$ would absorb high frequency acoustic waves and therefore prevent the use of wide band modulations. The crystals should be at least about 3mm in any other direction, to provide a sufficient length for efficient light modulation to occur; about 3mm to about 1cm is a practical range of sizes for width and length.

The crystal TlGaSe$_2$ has space group P2$_1$/m, with $a = b = 7.60 \pm 0.08$ A, $c = 31.36 \times 2 \pm 0.08$ A, and $\beta = 90'\ 20' \pm 5'$. It is pseudo-tetragonal; thus, although it is actually monoclinic, for practical purposes it can be treated as tetragonal. The cell volume is $1811 \times 2$ A$^3$ and there are 16 molecules per cell. The density (measured) is 6.4g/cm$^3$. The crystal is optically biaxial and its refractive index is about 2.7. The transparency range is about 0.6 to about $20\mu m$, and its acoustic-optic figure of merit, M$_2$, measured relative to fused quartz at a light wavelength of 0.632 micrometers is 260. The figure of merit depends upon the orientation of the crystal and the type of waves used. Longitudinal waves parallel to the $c$-axis were used to obtain the above figure. The acoustic properties of the crystal were measured by the conventional pulse echo technique. The longitudinal wave velocities are $2.5 \times 10^5$ cm/sec for propagation parallel to the $c$-axis and $3.3 \times 10^5$ cm/sec for propagation perpendicular to the $c$-axis and the shear wave velocities are $7.5 \times 10^4$ cm/sec for propagation parallel to the $c$-axis, and $1 \times 10^5$ cm/sec for propagation to the $c$-axis. The crystal has a deep red color and melts at $779°\pm 3°C$.

Most importantly, the TlGaSe$_2$ crystal possesses the highly unusual property of cleaving into very thin plates perpendicular to its $c$-axis. Additional information can be found in an article in the October 1973 issue of the Journal of Applied Crystallography, Vol. 6, Part 5 by T. J. Issacs titled "Crystal Data For Thallium Gallium Diselenide, TlGaSe$_2$."

The compound TlInS$_2$ was believed to be dimorphic (see the previously-cited article by H. Hahn) but is actually tetramorphic. The alpha form may occur at low temperatrue (i.e. <500°C) and is conducting and opaque. There are one triclinic and two monoclinic "beta" forms and all are produced at temperatures over 500°C. Any one of the beta forms can exist at room temperature although it is very difficult for the highest temperature form. The beta forms are yellow, transparent, and have high resistivity. The beta forms melt at $777°\pm 5°C$ and have a transparency range of about 0.526 to about $25\mu m$, but above about $15\mu m$ absorption begins to increase.

$\beta$-TlInS$_2$ also possesses the unusual property of cleaving to very thin plates. Its figure of merit, M$_2$, has not been measured but is expected to be comparable to the M$_2$ of TlGaSe$_2$. The longitudinal wave velocities are $2.5 \times 10^5$ cm/sec for propagation parallel to the $c$-axis and $3 \times 10^5$ cm/sec perpendicular to the $c$-axis, and the shear wave velocities are $8.3 \times 10^4$ cm/sec for propagation parallel to the c-axis and $1.0 \times 10^5$ cm/sec for propagation parallel to the b-axis.

The composition having optimum properties for both crystals appears to be stoichiometric, but compositions within 5% of stoichiometry are contemplated within the scope of this invention. Other crystals having related compositions have been found to be unsuitable for optical waveguide modulators. For example, $TlGaS_2$ is too soft and $TlInSe_2$ does not cleave to form thin plates. The crystals can be grown by the Stockbarger technique illustrated by the examples.

EXAMPLE I 8.1748g. thallium, 2.7888g. gallium, and 6.3168g. selenium, all of purity in excess of 99.999 wt%, were reacted together in an evacuated silica-glass tube at about 900°C. The tube was kept at that temperature for about 6 hours with periodic shaking, and then cooled to room temperature. The $TlGaSe_2$ compound was broken up and placed in an 8mm diameter silica-glass crystal-growing tube under a pressure of 0.8 atm. of pure, dry argon. The tube had a necked-in section of approximately 1mm to initiate growth of a single crystal. The tube was placed in a two-zone furnace and slowly (17.5mm/day) lowered from a temerature zone of about 820°C to a temperature zone of about 600°C at a temperature gradient of about 15°C/mm. The single crystal grew at an angle of about 30°to the tube and was about ½ cm in diameter by about 2cm long. The crystal cleaved easily at the 30°angle to produce elliptical plates about ½ cm by ¾ cm and as thin as about 10$\mu$m. It is expected that thinner plates can be produced with sophisticated cleaving equipment.

A plate of the crystal about 75$\mu$m thick was cemented to a glass substrate ¼ inch by ¼ inch by 1 inch long using phenyl salylicilate cement. Glass fibers 5 mils in diameter having very flat, smooth ends were cemented to the edge of the crystal plate as shown in the drawing using Canada balsam cement. A layer of MgF about 0.3$\mu$m thick was vacuum deposited on the crystal. A layer of chromium about 0.05$\mu$m thick was vacuum deposited on the MgF layer, followed by a vacuum deposited layer of gold about 0.2$\mu$m thick; the chromium is used to aid in the adherence of the gold. A layer of zinc oxide about 5$\mu$m thick and about 2mm square was deposited on the gold by sputtering and additional chromium and gold layers were vacuum deposited as before. Wires were soldered to the two gold electrodes.

Light from a helium-neon laser was focused into the input end of one of the light fibers. A photomultiplier was placed at the end of the other light fiber to monitor the output. A radio-frequency pulse having a frequency of 400 MHz was sent through the electrode and a modulation of the light was observed.

EXAMPLE II

Example I was repeated using 10.2185G. thallium, 5.7410g. indium, and 3,2064g. sulphur. The compound $\beta$-$TlInS_2$ was made by heating the elements at about 900°C for several hours with periodic shaking. The compound was cooled, broken up, and placed in a crystal-growing tube under 0.8 atm. pure, dry argon and the crystal grown at a rate of 12.7mm/day by lowering the tube through the melting point (777°± 5°C) at a steep temperature gradient. The crystal of $\beta$-$TlInS_2$ grew vertically and was about ½ cm thick by about ½ cm wide by about ¾ cm long. It was cleaved lengthwise to produce plates about 50 to about 150$\mu$m thick and about ½ cm wide by about ¾ cm long. Plates of this cyrstal can be used to form an optical waveguide modulator as described in Example I.

What we claim is:
1. An optical waveguide modulator comprising
   1. a single crystal selected from the group consisting of $TlGaSe_2$ and $\beta$-$TlInS_2$ which is 1 to about 50 microns thick and at least about 3mm in width and length;
   2. means for generating an acoustic wave in said crystal moving across the thickness of said crystal; and
   3. means for passing a monochromatic light beam from an incoming waveguide through said crystal along the length of said crystal, then back into an outgoing waveguide.
2. An optical waveguide modulator according to claim 1 wherein said crystal is $TlGaSe_2$.
3. An optical waveguide modulator according to claim 1 wherein said crystal is $\beta$-$TlInS_2$.
4. An optical waveguide modulator according to claim 1 wherein said means for generating an acoustic wave is a transducer mounted on said crystal.
5. An optical waveguide modulator according to claim 4 wherein said transducer is a shear wave generating transducer which is mounted on said crystal so that the shear waves generated by it are perpendicular to the path of said light beam in said crystal.
6. An optical waveguide modulator according to claim 1 wherein said incoming waveguide is an optical fiber having a flat end which is cemented to one end of said crystal, and said outgoing waveguide is an optical fiber having a flat end which is cemented to the opposite end of said crystal.
7. An optical waveguide modulator according to claim 1 wherein said crystal is mounted on a flat substrate which has a lower refractive index than said crystal.
8. A method of modulating light comprising
   1. passing a monochromatic light beam from an incoming waveguide through the length of a crystal selected from the group consisting of $TlGaSe_2$ and $\beta$-$TlInS_2$ which is 1 to about 50 microns thick and at least about 3mm in width and length, then coupling, said light beam to an outgoing waveguide; and
   2. generating an acoustic wave in said crystal moving across the thickness of said crystal.
9. A method according to claim 8 wherein said crystal is $TlGaSe_2$.
10. A method according to claim 8 wherein said crystal $\beta$-$TlInS_2$.
11. A method according to claim 8 wherein said acoustic wave is generated by means of a transducer mounted on said crystal.
12. A method according to claim 11 wherein said acoustic wave is a shear wave propagated perpendicular to the path of said light beam in said crystal.
13. A method according to claim 8 wherein said incoming waveguide is an optical fiber having a flat end which is cemented to one end of said crystal, and said outgoing waveguide is an optical fiber having a flat end which is cemented to the opposite end of said crystal.
14. A method according to claim 8 wherein said light is coherent and has 1 to about 6 modes.

* * * * *